United States Patent [19]
Tupper et al.

[11] 3,731,884
[45] May 8, 1973

[54] APPARATUS FOR PREPARING FRAGMENTS FROM TIRE CASINGS

[75] Inventors: Roy B. Tupper; Myron D. Tupper, both of Sandy; Norman C. Locati, Lake Oswego, all of Oreg.

[73] Assignee: Lester M. Thorpe, Portland, Oreg.

[22] Filed: Nov. 29, 1971

[21] Appl. No.: 202,967

[52] U.S. Cl. ..................241/222, 83/176, 83/356.3
[51] Int. Cl. .............................................B26d 1/28
[58] Field of Search.....................83/176, 355, 356.3, 83/411; 241/14, 220, 222, 55, 56; 51/132

[56] References Cited

UNITED STATES PATENTS 2,214,461   9/1940   Hendry.................................83/176
2,321,936   6/1943   Pollock.................................51/132
3,656,697   4/1972   Nelson.................................241/222

Primary Examiner—Willie G. Abercrombie
Attorney—M. H. Hartwell, Jr.

[57] ABSTRACT

Apparatus for preparing fragments from tire casings and the like. The specific apparatus disclosed means revolvably supporting the tire casing for rotation about its axis. Such supporting means also includes opposed squeeze rollers that bear against opposite sidewalls of the tire casing, thus to flatten the tire casing. Cutting means in the apparatus includes a cutter which moves during operation in successive cutting passes across the periphery of the tire casing adjacent where such is confined by said opposed squeeze rollers.

10 Claims, 3 Drawing Figures

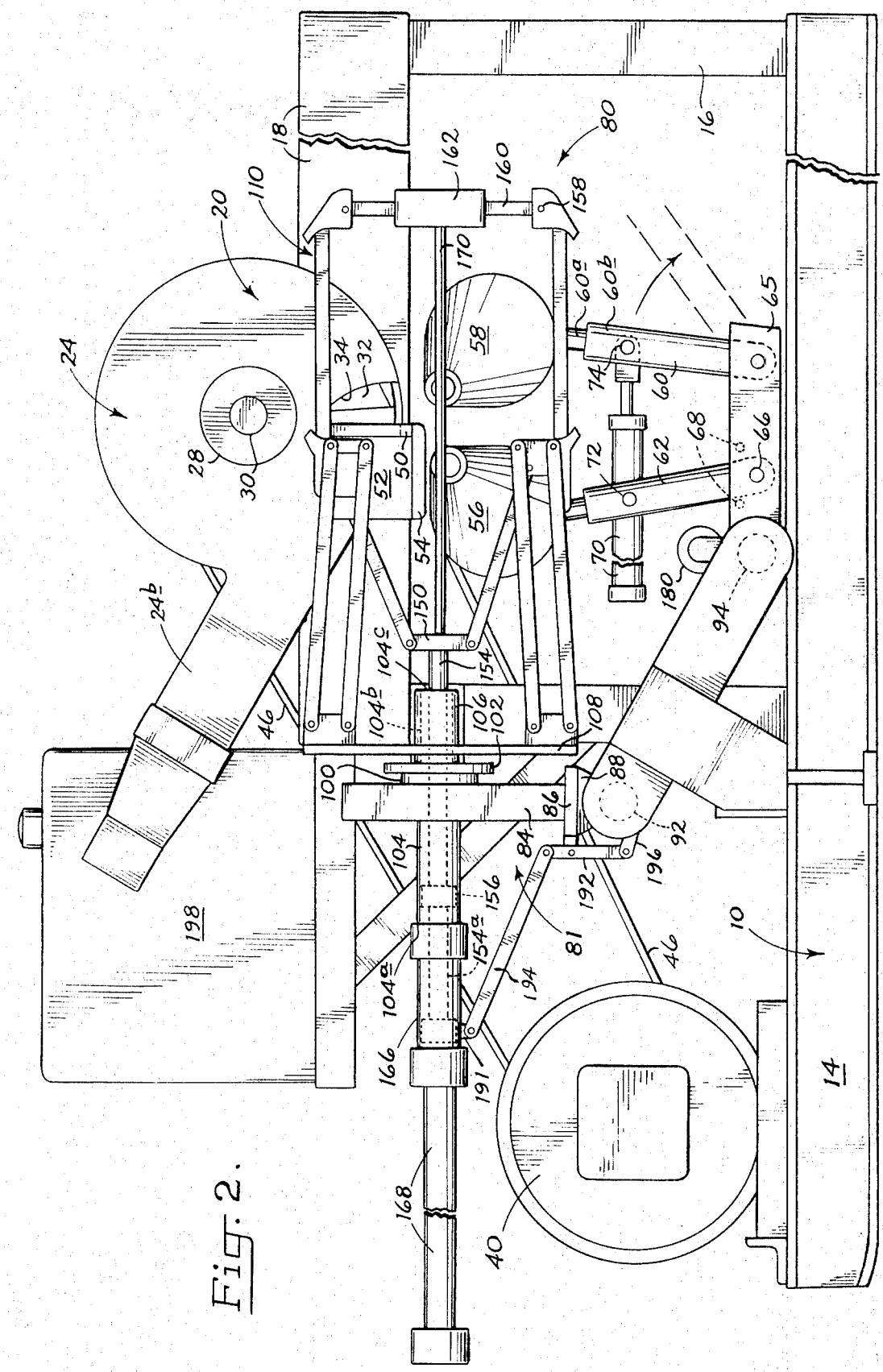

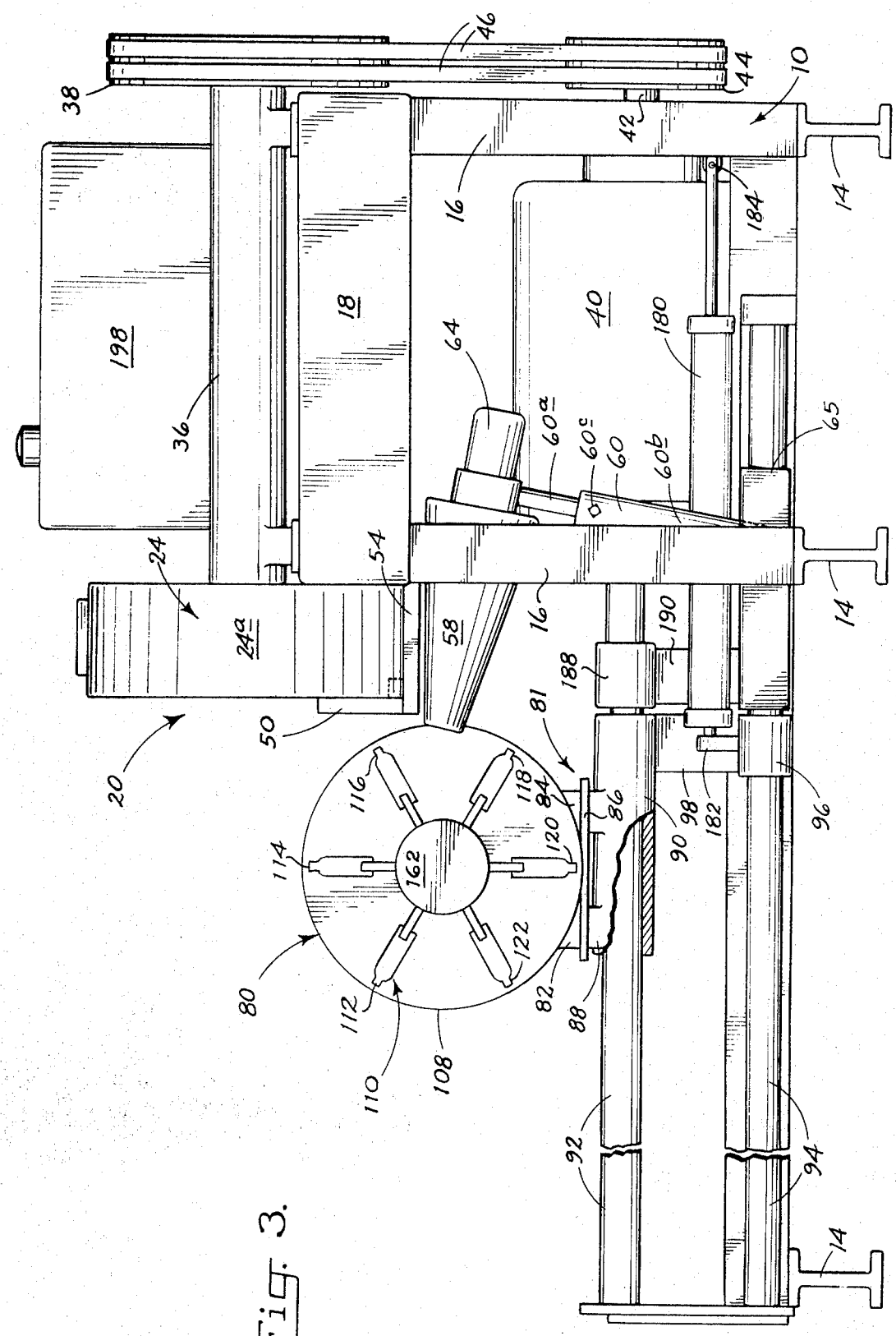

APPARATUS FOR PREPARING FRAGMENTS FROM TIRE CASINGS

This invention relates generally to apparatus for destroying tire casings, and more particularly to such apparatus which destroys tire casings by producing cut fragments therefrom.

The disposal of used tire casings is becoming an increasingly difficult problem to solve, with the number of such casings which must be disposed of increasing every year, and with conventional methods of disposal, such as burning, now being precluded for environmental reasons. A tire casing in its natural state is a relatively bulky item, and as a consequence as tire casings accumulate, they soon take up a large amount of space, which has served to emphasize the need for a practical manner of tire disposal.

I have observed that the bulk of a tire casing may be substantially reduced if the casing is reduced to fragments of relatively small size. The fragments are relatively easily handled, and can be employed, for example, as a fill material, with a far more satisfactory type of result than when the full casing is used. The tire fragments themselves are far less bulky than whole tire casings.

A general object of this invention, therefore, is to provide novel apparatus for reducing tire casings to fragment form.

More particularly, this invention concerns apparatus of the type described wherein tire fragments are cut from the periphery of the casing as such is relatively rotated with respect to a cutting means in the apparatus. Using this approach, fragments are readily cut progressing inwardly on the casing from all soft regions of the casing, i.e., the tread and sidewall regions, to leave as remaining integral pieces only the metal reinforced bead regions found in the usual casing.

A more specific object of the invention is to provide apparatus for cutting fragments from a tire casing, featuring squeeze members for deforming the casing in the region where cutting takes place to flatten it and bring the sidewalls together with folding of the tread, and a cutting device which is moved in successive passes across the periphery of the casing to cut off fragments of such deformed casing.

Yet a further object of the invention is to provide such apparatus with novel means for rotating the tire casing about its axis and for advancing it relatively to the cutting device, by relative shifting laterally of the tire casing's axis, to present new regions for cutting as fragments are progressively cut from the tire casing.

The apparatus contemplated can rapidly and efficiently reduce to fragments tire casings within a wide range of sizes. The apparatus need not have a massive or expensive construction, whereby the apparatus lends itself to being installed at multiple disposal points within a given region.

These and other objects and advantages are attained by the invention which is described in more detail below, in conjunction with the accompanying drawings wherein:

FIG. 2 is a side elevation of the apparatus, viewing the side presented to the top in FIG. 1; and FIG. 3 is an end elevation of the device, viewing it from the end presented to the right in FIG. 2.

Figure 1:
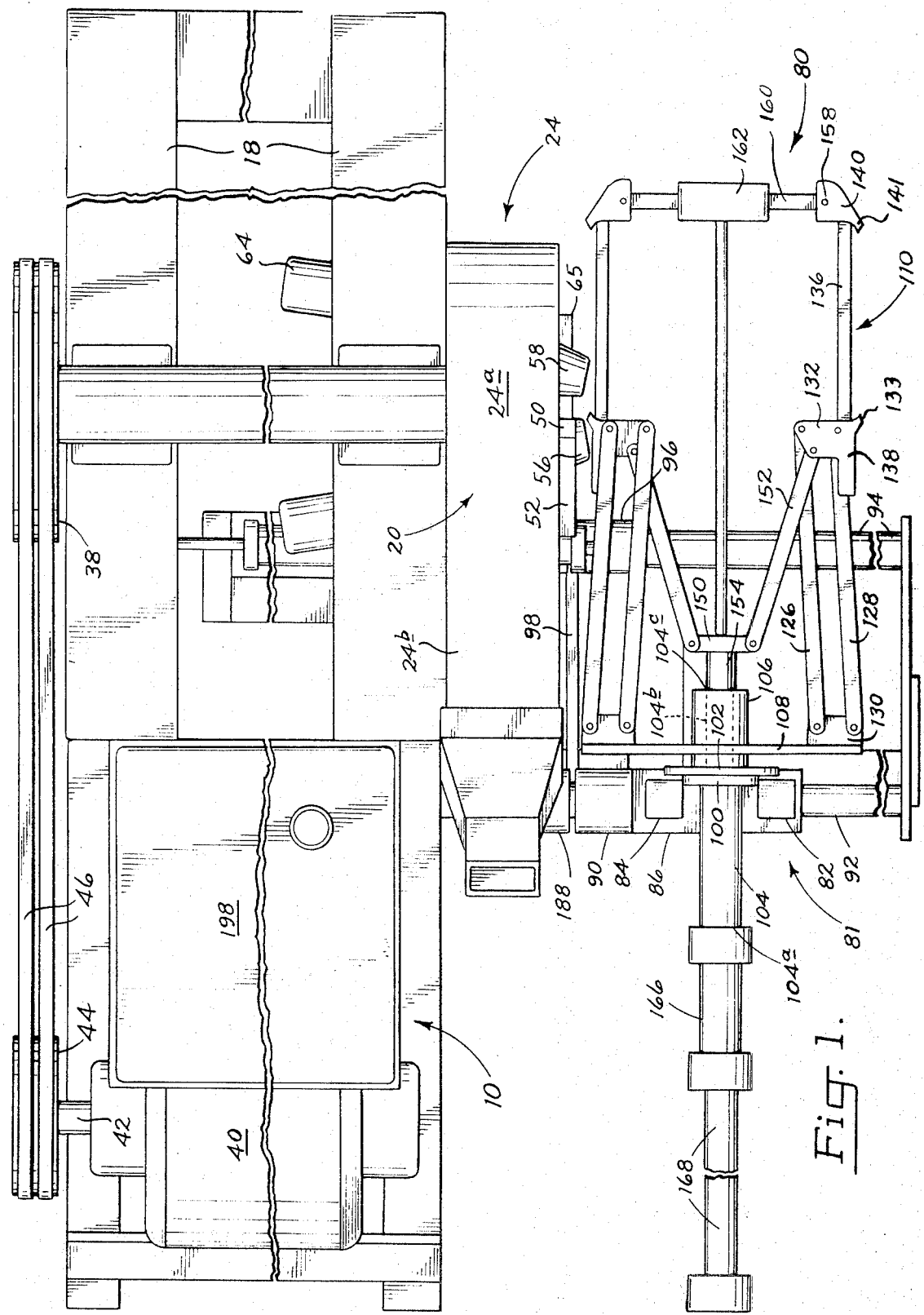
FIG. 1 is a top plan view of apparatus as contemplated herein.

Considering now in more detail the specific embodiment of the invention illustrated in FIGS. 1, 2, and 3, the apparatus illustrated includes a frame, given the general reference numeral 10, including a base made up of beams 14 which normally rests on the floor, and posts 16 suitably secured to the base supporting what is referred to as an elevated table area 18.

Table area 18 is used in the mounting of a cutting means given the general reference numeral 20, which is actuated to cut fragments from the periphery of a tire casing as the casing is progressively rotated and advanced toward the cutting means, in a manner to be described.

Describing the cutting means in more detail, a hollow housing is indicated at 24, including a substantially cylindrical portion 24a which houses revolving cutter structure to be described, and a neck 24b extending tangentially from portion 24a and with the interior thereof communicating with the interior of portion 24a. The neck constitutes a discharge duct for tire fragments cut off by the cutting means. The housing is secured to table area 18 in a suitable manner.

The revolving cutter structure within the housing includes (see FIG. 2) a mounting 28 joined to a shaft 30 for rotation with the shaft. Secured to the mounting adjacent its periphery are one or more cutters, such as the one shown at 32 which is moved in a circular sweep on rotation of the mounting. The housing has an opening 34 adjacent its base in FIG. 2, which receives a peripheral portion of the tire casing during the cutting of such casing.

As perhaps best illustrated in FIG. 3, the shaft 30 just described extends rearwardly from the casing through an arbor tube 36 and has mounted on its opposite extremity sheaves 38. A motor 40 mounted on the frame beneath table area 18 has its output shaft 42 mounting sheaves 44. Drive is transmitted from the motor to shaft 30 by belts 46 trained over the pairs of sheaves.

Also part of the cutting means 20 is an anvil 50 which is positioned as shown in FIGS. 2 and 3, with the anvil partially extending into the housing through opening 34. The anvil has a vertical and a joining horizontal edge inside the housing, adjacent the path of corresponding edges in cutters 32. A cutter, on moving past the anvil, produces a shearing action which cuts off a fragment from any casing disposed against the anvil. The anvil is mounted in place through plate 52 which is joined to a bracket plate 54 secured to platform 18.

A particular feature of the preferred embodiment of the invention is the provision, in the means for revolvably supporting the tire casing as fragments are cut therefrom, of opposed squeeze members which function to confine the tire casing by bearing on opposite sides of the casing whereby the same is flattened. Such squeeze members take the form of tapered rollers 56, 58, shown positioned below casing or housing 24. Each of the rollers is supported on the upper extremity of a roller support, exemplified by supports 60, 62. The rollers are rotatably mounted for rotation about their axes, and a motor, such as the hydraulic motor shown at 64, is connected to each roller, which operates to rotate the roller under power with energizing of the motor. Each roller support, and referring to FIG. 2, includes a member such as that shown at 60a telescopically received in a member 60b secured in place as by fastener 60c. This arrangement permits adjustments to be made in the effective length of a roller support, and thus permits adjustments in the positioning of a tapered roller with respect to the housing 24.

Each roller support adjacent its base is journaled, as at 66, on a platform 65, for swinging movement about a nearly horizontal axis extending normal to the longitudinal axis of the roller which it mounts. Limiting movement of roller support 62 are abutments 68. A fluid-operated ram 70, with its cylinder journaled at 72 to support 62, and its rod journaled at 74 to support 60 is extended to swing support 60 in FIG. 2 downwardly and to the right of support 62, thus to spread the rollers apart. In mounting a tire casing in the apparatus, the rollers are moved apart, which permits one side of the tire casing to be brought up against roller 56. Ram 70 is then actuated to bring the two rollers against each other. When this is done, the rollers in effect pinch the tire casing by bearing on the sidewalls, whereby the portion of the tire casing which is presented to the cutting means for cutting comprises, at least during initial cutting, the tread of the casing folded back on itself in a U-shaped bight. With the tread cut away, it is portions of the two sidewalls pressed together which are moved into the cutting means.

The hydraulic motors connected to the rollers produce movement of a tire casing, with portions of the casing being subjected to cutting moving upwardly into the housing 24 and against the anvil as cutting progresses. The casing during such cutting is revolved about its axis, as will be gone into in further detail. The hydraulic motors therefore constitute a means for rotating the casing under power about this axis.

Also part of the means for supporting a tire casing is mechanism which grips a tire casing through its bead regions, which is used in advancing the casing by shifting it laterally of its axis to advance material into the cutting mechanism as fragments are progressively cut off. This mechanism for gripping the bead regions and shifting the tire casing is indicated generally in the drawings at 80.

Further considering mechanism 80, a carriage 81 is provided in the apparatus, in the form of a pair of posts 82, 84 having their bases joined to a plate 86 connected by gusset structure 88 to a sleeve 90. The sleeve is slidably received on a guide rod 92 disposed horizontally in the machine, and suitably fixedly mounted in a position somewhat elevated above beams 14. Another fixedly mounted guide rod paralleling guide rod 92, but somewhat below it, is shown at 94. A sleeve 96 is slidably received on guide rod 94, and interconnecting sleeves 90, 96 is a plate 98. Sleeve 96 and plate 98 serve to inhibit sleeve 90 from rotating on guide rod 92, and thus maintain sleeve 90 positioned with posts 82, 84 extending vertically upwardly. The carriage, however, comprising the posts, sleeves, and associated structure is movable along a path defined by the guide rods 92, 94.

Mounted in a fixed position on the carriage with such disposed between the posts as shown in FIG. 1, and rigidly supported thereon through block 100 and plate 102, is a cylinder 104. The cylinder extends from an end 104a through the plate and block, and in an expanse indicated in dotted outline at 104b to an end 104c. Suitably journaled on this expanse 104b of the cylinder, and constrained from axial movement therealong, is a hub 106. A circular plate 108 having hub 106 joined to it at its center, is mounted on the hub.

Plate 108 provides a mounting for multiple arms in a so-called spider structure generally given the reference numeral 110. In FIG. 3, six such arms are illustrated at 112 through 122. To obtain greater clarity and simplicity in the drawings, only two such arm structures are shown in FIGS. 1 and 2 with the others having been removed.

With reference to FIGS. 1 and 2, and considering arm structure 112, such includes an inner section including bars 126, 128 journaled on a bracket 130 which is secured to plate 108. Outer extremities of bars 126, 128 are pivotally mounted on a clamp unit 132. The clamp unit includes a radially outwardly projecting clamp finger or portion 133 utilized in engaging the tire casing.

Each arm in the spider structure, and with further reference to arm 112, includes an outer section exemplified by rod 136 slidably received within a guide portion 138 of the clamp unit. Joined to the outer end of the rod is a clamp unit 140 with a radially outwardly projecting clamp finger or portions 141.

The inner sections of the various arms, made up of bars 126, 128 and clamp units 132, are actuated to move the clamp units radially outwardly (important in handling larger diameter tire casings) utilizing a collar 150 connected to the inner sections of the arms by links such as those shown at 152. The links are pivoted at their inner ends to the collar and at their outer ends to the various clamp units. The collar is rotatably mounted on a piston rod 154 which extends into cylinder 104 earlier discussed, and which has a piston 156 joined to it disposed within the cylinder. The rod and cylinder make up a fluid-operated ram, and with extension of the ram the rod moves outwardly of the cylinder to move the collar outwardly with radial outward movement of the various clamp units 132 resulting.

Clamp units 140 which are joined to rods 136 making up the outer sections of the arms, are pivotally joined as at 158 to guide rods 160. These guide rods are reciprocatively received within accommodating bores of center guide 162. With the construction, and on clamp units 132 being shifted radially outwardly, the clamp units 140 will follow in this radial movement.

Mounted at the end of cylinder 104 is a spacer sleeve 166 (the function of which will be described later). Joined to the rear of the spacer sleeve is another cylinder 168. Associated with this cylinder is an elongate piston rod 170 which joins with a piston (not shown) disposed within the cylinder. Piston rod 154 is hollow, thus to accommodate the passage of rod 170 down through its interior. The center guide is journaled to the right end of piston rod 170 in FIG. 2.

Rod 170 and cylinder 168 together make up a fluid-operated ram which is used in shifting center guide 162 in an axial direction. With movement of the center guide 162 inwardly, clamp units 140 are made to shift toward clamp units 132, and with movement of the guide outwardly, the former move away from the latter clamp units.

Carriage 81, comprising sleeves 90, 96, plate 98, and the spider structure supported by the carriage, are shifted laterally of the axis of any tire supported on the spider structure (which is to say along the path of movement provided by guide rods 92, 94) utilizing ram 180 (see FIG. 3) having its cylinder end connected to the carriage at 182, and its rod end anchored to the frame at 184.

Roller supports 60, 62 have been described supporting the tapered rollers that are brought together to confine opposite sides of a tire casing being processed. Platform 65, earlier described, upon which the bottoms of these roller supports are journaled, is permitted a limited amount of movement in the apparatus paralleling the path of movement of carriage 81. Further explaining, as perhaps best illustrated in FIG. 3, slidably mounted on rod 92 along with sleeve 90 is another sleeve 188. Yet another sleeve (obscured by the platform in FIG. 3) is slidably mounted on rod 94, and these two sleeves are joined together by the plate 190. Platform 65 described is secured to this subcarriage structure formed by the sleeves and plate 190.

Platform 65 which supports the base of roller supports 60, 62 is adjusted with respect to the spider structure carried by carriage 81, to enable the reduced ends of the tapered rollers carried by the roller supports to be as close as practical to the bead regions of a tire casing during the processing of a casing. With a large diameter tire, and referring to FIG. 3, this would mean that the carriage 81 carrying the spider structure should be shifted away from the subcarriage carrying the roller supports and rollers. With smaller diameter tire casings, the adjustment of the two carriages would be towards each other on guide rods 92, 94. This adjustment is performed automatically in the apparatus contemplated, in response to actuation of the fluid-operated ram formed by cylinder 104 and rod 154.

Further explaining, and referring to FIG. 2, a hollow spacer 166 has earlier been described spacing cylinder 104 from cylinder 168. Rod 154 extends out from both ends of cylinder 104, and has a protruding portion 154a which is received within the confines of the hollow spacer. Secured to this protruding portion, and projecting downwardly through the bottom of the spacer through an accommodating slot, is a lug 191.

With continued reference to FIG. 2, shown at 192 is a pivoted lever arm which is pivoted to plate 86 of carriage 81. The upper end of the lever arm is connected by link 194 to lug 191. The lower end of the lever arm is connected to a bell crank member partially shown at 196. The bell crank member in turn is linked (not shown) to the subcarriage which supports platform 65, and the roller supports mounting the tapered rollers. The linkage is such that on actuation of the ram made up of cylinder 104 and rod 154, whereby collar 150 is caused to move to the right in FIG. 2 (such movement producing radially outward movement of the clamp units as when accommodating a larger diameter size tire casing), carriage 81 is made to shift on rods 92, 94 slightly away from the subcarriage mounting platform 65. With reversed actuation of this ram, of course, a reversed type of adjustment takes place.

Completing the description of the apparatus illustrated, shown at 198 is a tank for holding hydraulic fluid utilized in the actuation of the various rams and the hydraulic motors described. Pumps, hosing, and other specifics have been deleted from the drawings to obtain clarity.

Generally describing the operation of the device just described, to load a tire casing onto the apparatus, tapered rollers 56, 58 are swung apart by actuation of ram 70. Collar 150 is positioned, through actuation of the ram made up of cylinder 104 and rod 154, to position the clamp units radially inwardly a sufficient distance to enable the tire casing to be inserted onto the spider structure with the beads of the casing passing over clamp units 140. The ram made up of cylinder 168 and rod 170 is extended prior to tire placement a sufficient distance to enable the casing to rest conveniently on rods 136. The spider structure (which also is referred to herein as clamp mounting structure) extends into and through the central void region circumscribed by the tire casing when such is mounted on the spider structure.

With the tire casing thus positioned, the ram comprising cylinder 104 and rod 154 is actuated to extend radially the clamp units and bars 136, with the bars coming up against the inner periphery of the casing defined by the beads of the casing. The ram comprising cylinder 104 and rod 154 is actuated whereby clamp units 140 are caused to be moved axially toward clamp units 132. The clamp portions or clamps that are projecting radially outwardly on the various clamp units come together to grip onto the outer surfaces of the bead regions in the casing. The tire is now held with its axis coinciding with the axis of rod 170.

Also, and prior to cutting, ram 70 is actuated to bring the tapered rollers together with confinement of the tire casing by pinching it from the sides.

With the tire casing mounted, the casing is caused to revolve about its axis through actuation of the hydraulic motors which power the tapered rollers. The spider structure is so constructed that it is permitted to rotate freely while supporting the tire casing.

To produce progressive cutting up of the tire, carriage 81 which supports the spider structure is caused to advance along guide rods 92, 94 to move the periphery of the tire casing into the opening provided at the base of housing 24, thus to expose peripheral portions of the casing to the cutting action provided by anvil 50 and the cutters described. Cutting proceeds with revolving of the casing and advancing of the casing until all that substantially remains of the casing are the two bead regions which form the inner perimeter of a tire casing at each of its sidewalls. With cutting finished, carriage 81 is retracted. The rollers 56, 58 are separated, and the spider structure is collapsed with extending of the clamp units 140, to permit removal of these bead regions.

Tire fragments are produced which can be easily handled as by collecting them in a bin or container. A mass of such fragments has considerable less bulk than the bulk of the tire casings from which they were prepared. The fragments themselves have many uses, such as for example the production of a land fill of a superior nature.

While a specific embodiment of the invention has been described, it is appreciated that variations and modifications are possible. It is desired to include within this invention all such modifications as would be apparent to one skilled in the art.

It is claimed and desired to secure by Letters Patent:

1. Apparatus for preparing fragments from tire casings and the like comprising
opposed squeeze members adapted to confine the tire casing by bearing on opposite sides thereof,
cutting means for cutting fragments from the periphery of the tire casing adjacent where such casing is confined by the squeeze members, and
means for rotating the tire casing about the axis there-of as fragment cutting by said cutter means progresses.

2. The apparatus of claim 1, which further includes means for shifting the casing laterally of its axis and towards said cutting means as fragment cutting progresses.

3. The apparatus of claim 2, wherein the squeeze members comprise opposed roller members adapted to come up against opposite sidewalls of the tire casing, and the means for rotating the tire casing comprises motor means producing powered rotation of at least one roller member.

4. The apparatus of claim 2, wherein the means for shifting the casing laterally comprises clamp means for clamping onto the bead region of the tire casing, and a mounting for said clamp means accommodating movement laterally of the axis of the casing clamped thereby.

5. The apparatus of claim 2, wherein the means for shifting the casing laterally comprises clamp mounting structure which in operative position extends into the central void region circumscribed by the usual tire casing, adjustable clamps radiating from said mounting structure adapted to clamp onto the bead region of the tire casing, supporting means supporting the clamp mounting structure for rotation about the axis of the tire casing held by the clamp structure, and means for shifting said supporting means laterally of the axis of the tire casing.

6. Apparatus for preparing fragments from tire casings and the like comprising
clamp means for clamping onto the bead region of the tire casing, said clamp means including clamp mounting structure which in operative position extends into the central void region circumscribed by the usual tire casing, and adjustable clamps radiating from said mounting structure adapted to clamp onto the bead region of the tire casing,
cutting means spaced radially from said clamp means, for cutting fragments from the periphery of a tire casing held by the clamp means, and
means for relatively adjustably shifting said cutting means and clamp means to decrease the radial spacing between the two as fragment cutting progresses.

7. The apparatus of claim 6 which further comprises means for rotating under power a tire casing held by said clamp means with such rotation being about the axis of the tire casing.

8. The apparatus of claim 6, wherein said cutting means comprises an anvil and a movable knife movable across said anvil, and which further comprises means for confining the tire casing by bearing on opposite sides thereof adjacent said cutting means.

9. The apparatus of claim 6, wherein said cutting means comprises an anvil and a movable knife movable across said anvil, and which further comprises opposed squeeze members adapted to confine the tire casing by bearing on opposite sides thereof located adjacent said cutting means, said squeeze members by so confining the tire casing substantially flattening the casing adjacent the cutting means.

10. Apparatus for preparing fragments from a tire casing and the like comprising
means revolvably supporting the tire casing for rotation about the axis thereof,
cutter means including a cutting device movable in cut-ting passes across the outer periphery of the tire casing held by said first-mentioned means,
said first-mentioned means including means for confining the tire casing by bearing on opposite sides thereof adjacent said cutting means whereby the tire casing is reduced to a substantially flattened condition.

* * * * *